J. R. MOFFATT.
SEWING AND BINDING MACHINE.
APPLICATION FILED FEB. 26, 1912.

1,217,329.

Patented Feb. 27, 1917.
6 SHEETS—SHEET 2.

Fig. 2.

WITNESSES
Fenton S. Belt
Grace P. Brereton

INVENTOR
James R. Moffatt
By Sturtevant & Mason
Attorneys

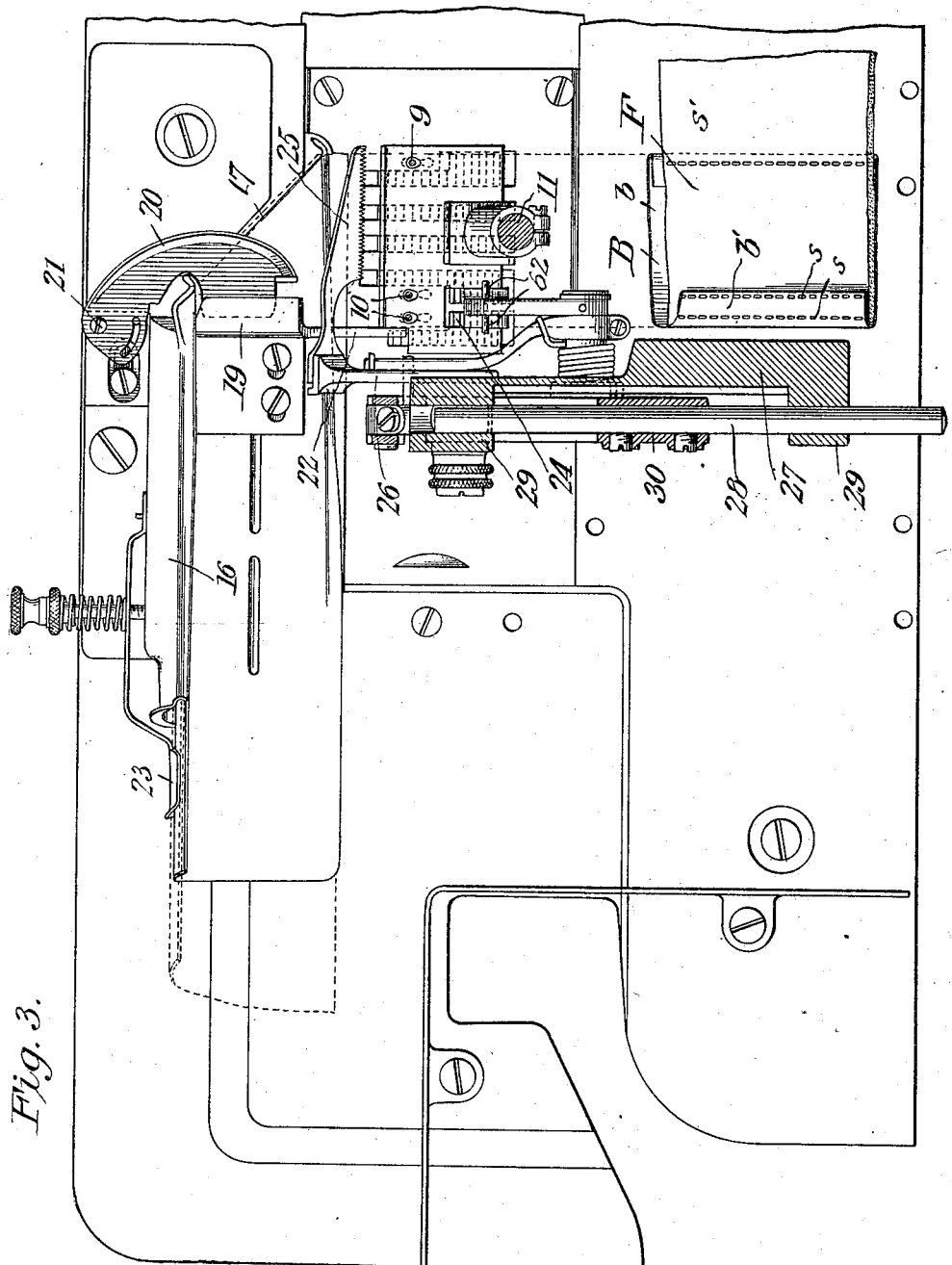

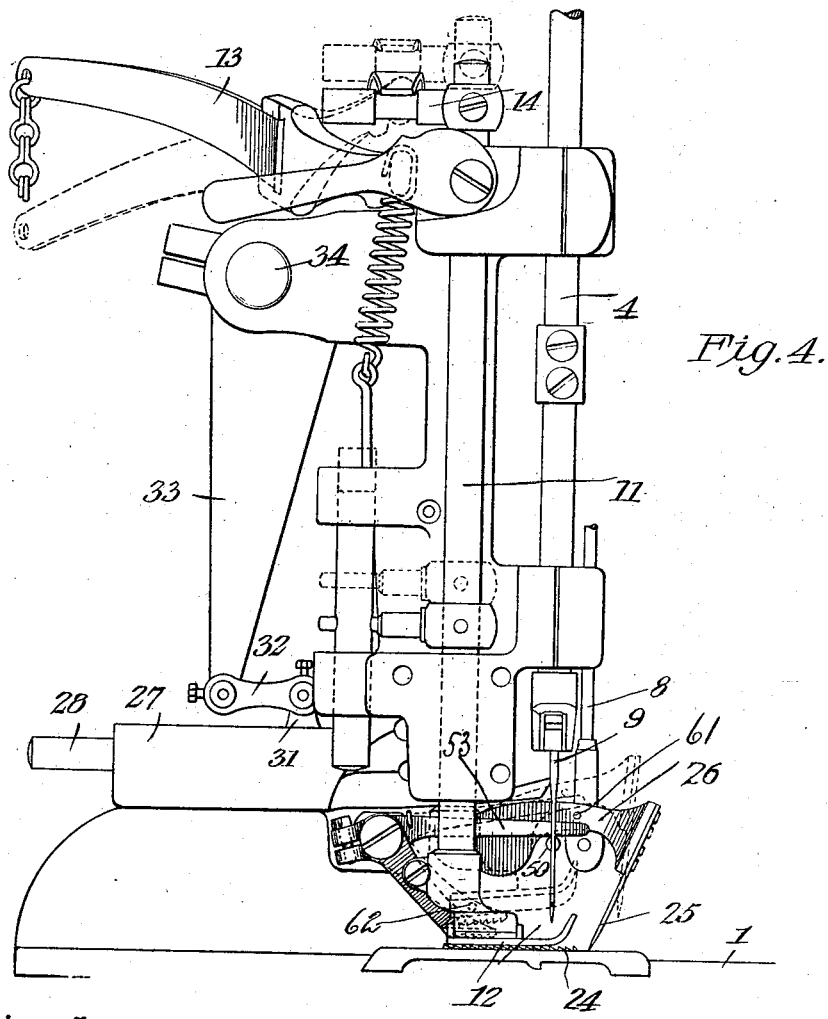

J. R. MOFFATT.
SEWING AND BINDING MACHINE.
APPLICATION FILED FEB. 26, 1912.
1,217,329.
Patented Feb. 27, 1917.
6 SHEETS—SHEET 5.
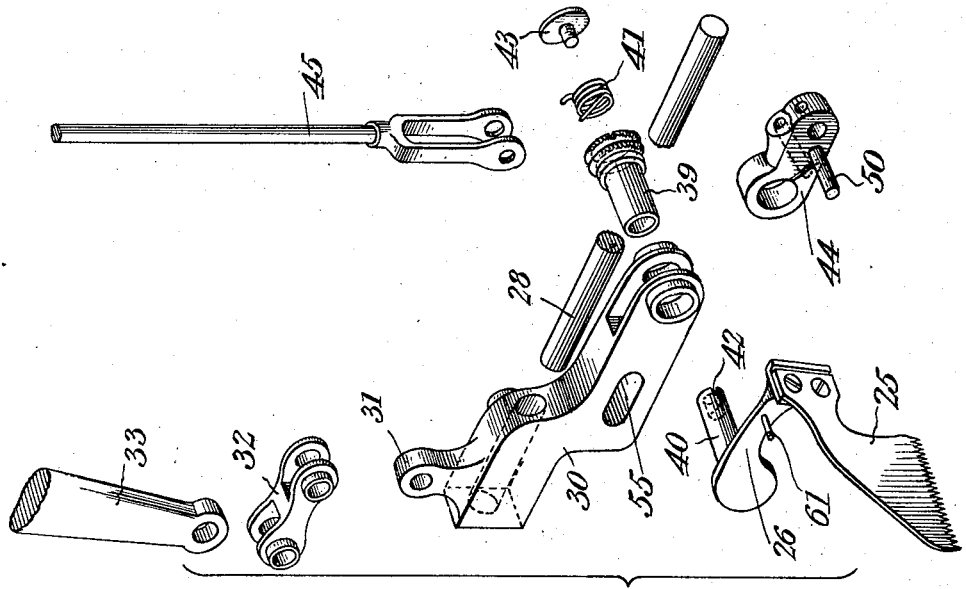
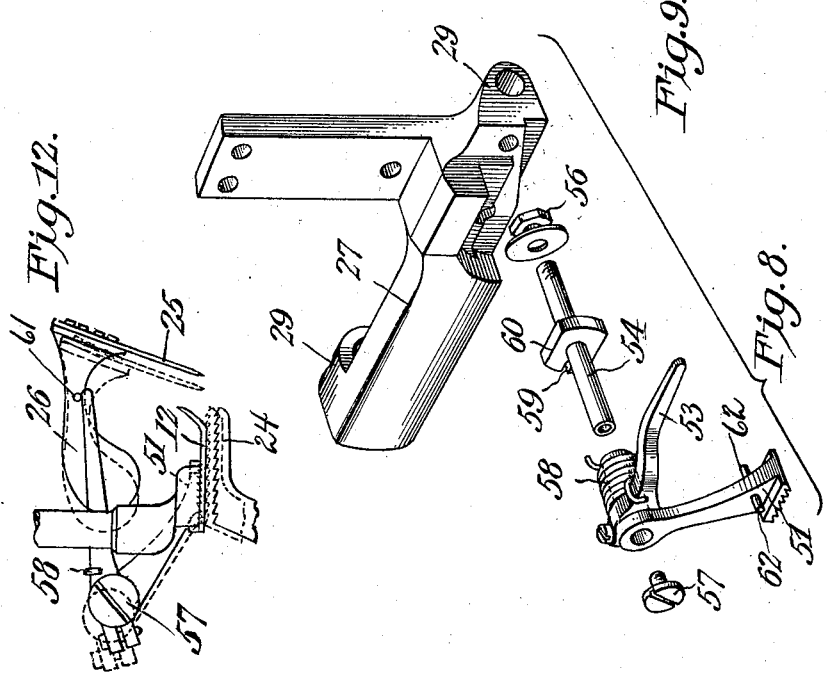
WITNESSES
Fenton S Belt
Grace P. Brereton
INVENTOR
James R Moffatt
By Sturtevant & Mason
Attorneys

J. R. MOFFATT.
SEWING AND BINDING MACHINE.
APPLICATION FILED FEB. 26, 1912.

1,217,329.

Patented Feb. 27, 1917.
6 SHEETS—SHEET 6.

WITNESSES
Finton S. Belt
Grace P. Brereton

INVENTOR
James R. Moffatt
By Sturtevant & Mason
Attorneys

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

SEWING AND BINDING MACHINE.

1,217,329.  Specification of Letters Patent.  Patented Feb. 27, 1917.

Application filed February 26, 1912. Serial No. 679,981.

*To all whom it may concern:*

Be it known that I, JAMES R. MOFFATT, a citizen of the United States, residing at Chicago, in the county of Cook, State of Illinois, have invented certain new and useful Improvements in Sewing and Binding Machines, of which the following is a description, reference being had to the accompanying drawing and to the figures of reference marked thereon.

The invention relates to new and useful improvements in sewing machines, and more especially to machines of this character for attaching a binding strip to a fabric.

An object of the invention is to provide devices for guiding and folding a binding strip and directing the same to the edge of a fabric, so that one edge of the binding strip will lap the face of the fabric to a considerably greater extent than the other.

A further object of the invention is to provide a machine of the above character with a feeding mechanism which includes a blade or foot operating upon the body fabric, which blade or foot is so manipulated relative to the main feed as to gather the body material relative to the binding strip.

A further object of the invention is to provide a machine of the above character with an auxiliary upper feed foot, which operates upon the upper face of the binding strip, which upper feeding mechanism moves in unison with the gathering feed foot, which is so controlled in its coöperation with the main feed, as to be ineffective to feed the binding strip except when said binding strip is engaged and fed by the main feed.

These and other objects will in part be obvious, and will in part be hereinafter more fully described.

In the drawings which show by way of illustration one embodiment of the invention,—

Fig. 2 is a rear view of the same;

Fig. 3 is a plan view of the work support showing the arrangement of the presser foot, the main feed, the auxiliary upper feed, the differential feed foot and binder, certain of the parts being in section;

Fig. 4 is a view from the end of the machine, showing the relation of the presser foot and its support to the upper feed dog and the gathering foot, and also in dotted lines the manner of raising the upper dog and gathering foot from the presser foot lifting mechanism;

Fig. 5 is a detail in perspective of the lifting arm for the upper feed dog;

Fig. 6 is a detail in perspective of the ruffling blade or foot and the supporting arm therefor;

Fig. 7 is a detail in perspective of the upper feed dog;

Fig. 8 is a perspective view of the feed foot and the supporting bracket therefor, the parts being separated to show in detail the members for supporting the feed foot;

Fig. 9 is a perspective view, showing the carrier for the upper feeding members and the means for raising and lowering the same, the parts being separated to show in detail the essential members of the operating mechanism;

Fig. 12 is a detail view, showing diagrammatically the arrangement of the lower feed dog, the upper feed dog, the differential feed foot and the presser foot, and showing in dotted lines the ineffective movement of the upper feed dog.

Figure 1:
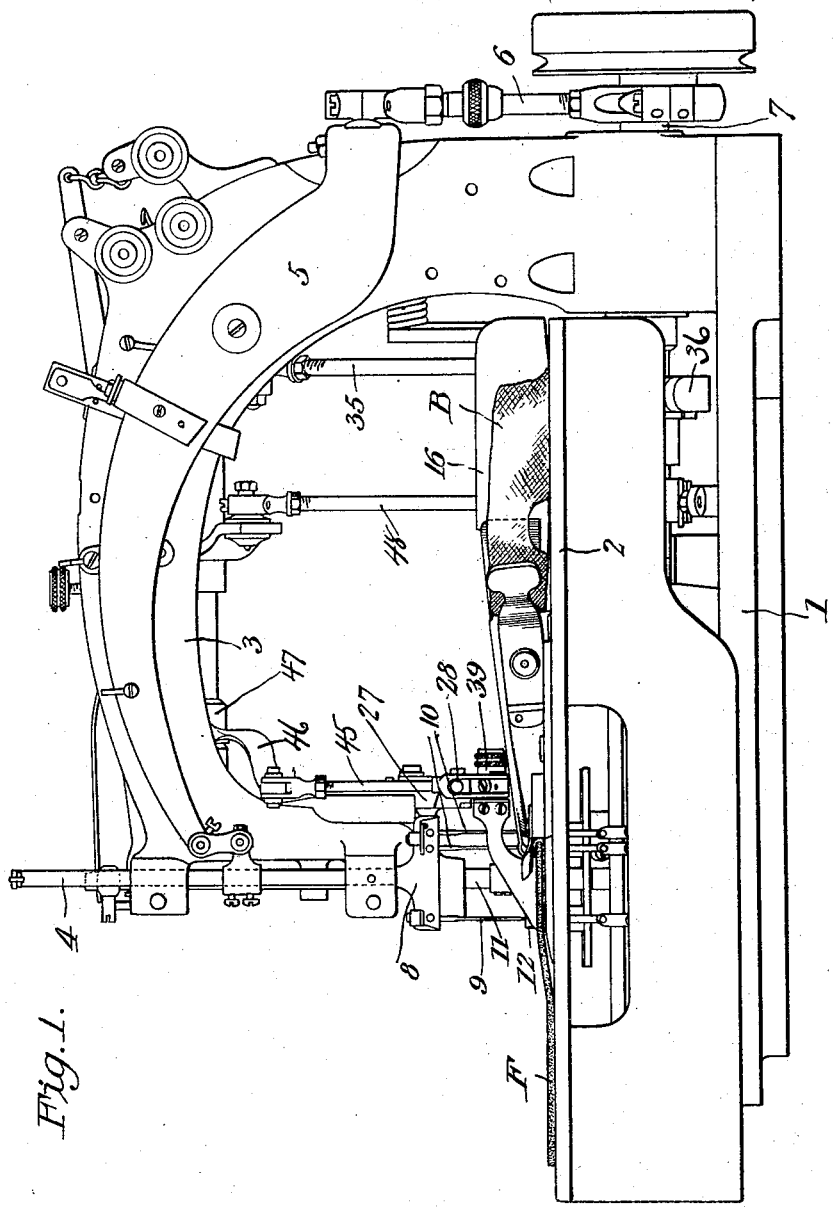
Figure 1 is a front view of a sewing machine having my improvements applied thereto.
Figure 10:
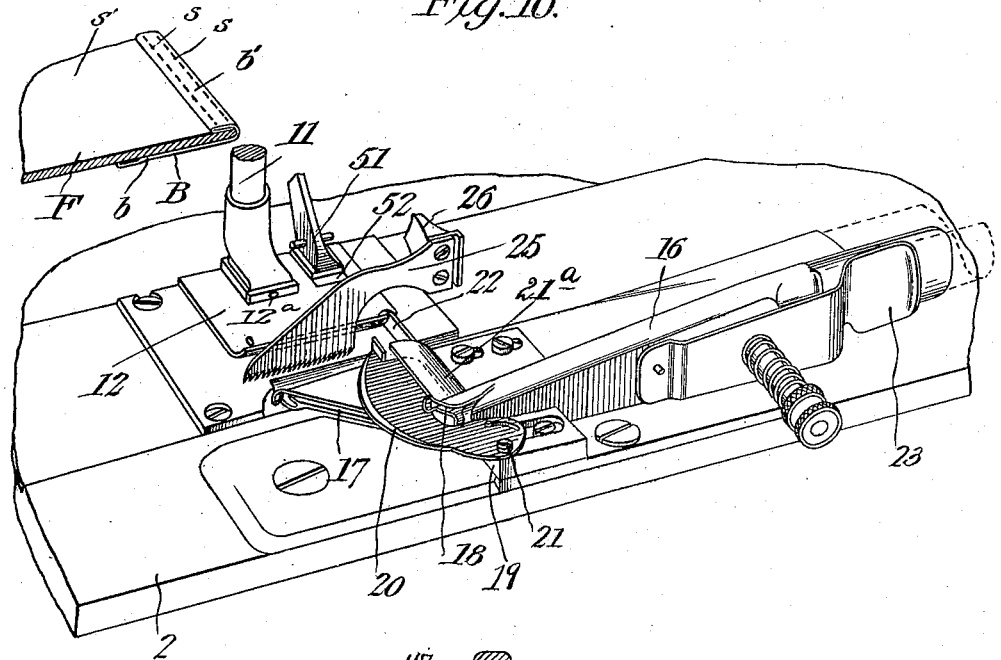
Fig. 10 is a perspective view showing the binder, the presser foot, the upper feed dog, the gathering foot and the relation of the same to one another.
Figure 11:
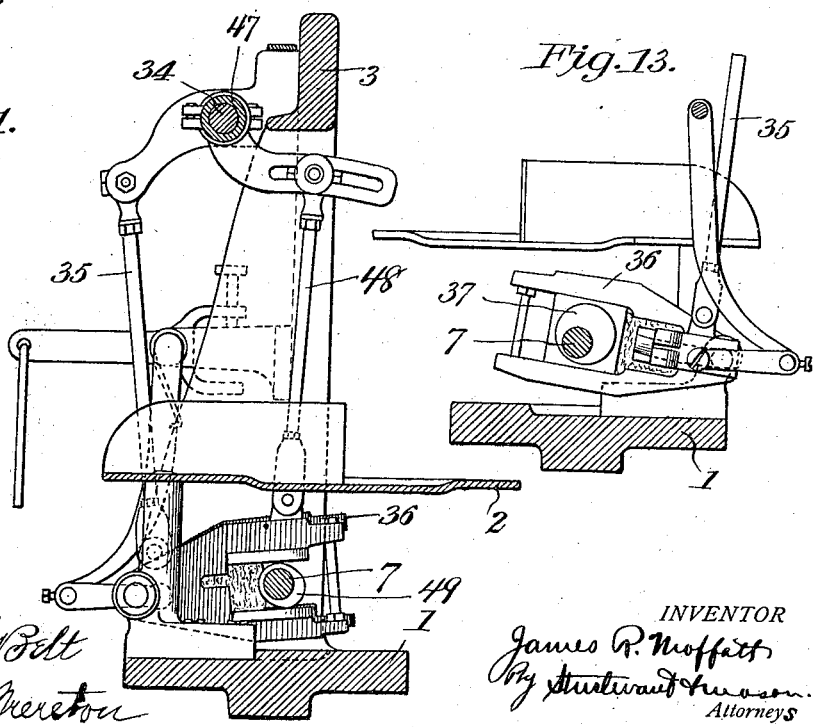
Fig. 11 is a sectional view showing the devices for reciprocating the upper feeding members and for raising and lowering the same.
Figure 13:
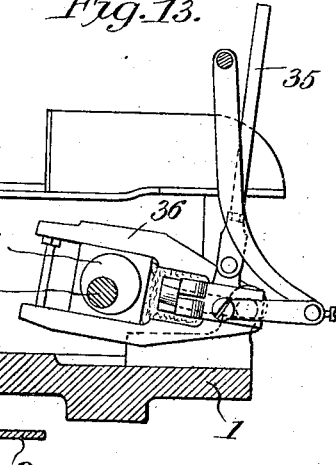
Fig. 13 is a side view of the yoke for moving the upper feed dog and feed, back and forth.

In carrying out the invention, the sewing machine consists of a supporting bed 1, on which is mounted a bed plate 2. An overhanging arm 3 is carried by the bed plate, and a needle bar 4 reciprocates in the forward end of the overhanging arm. Said needle bar is reciprocated by a lever 5, which is pivoted on the overhanging arm, and is operated by a link 6, which coöperates with an eccentric on the main shaft 7.

The needle bar carries at its lower end a needle head 8, in which is mounted a plurality of needles 9 and 10, 10. Coöperating with the needles beneath the work support are loopers which are preferably so constructed as to make with each needle single chain stitches. It is obvious, however, that the stitch-forming mechanism may be of any desired character.

A presser bar 11 is mounted in the overhanging arm and carries a presser foot 12 at the lower end thereof. Said presser foot is preferably pivoted to the presser bar by a pivot pin $12^a$, so that said foot may tilt in a direction laterally of the line of feed. The presser bar 11 is raised by the lever 13, which is pivoted to the overhanging arm, and at its forward end extends underneath a projecting lug 14 carried by the presser bar. A spring 15 yieldingly holds the presser foot against the material.

The above parts are of the usual construction, and will not need further detailed description.

The present machine is designed especially for stitching a binding strip B to a body fabric F, wherein the body fabric is preferably a knit or elastic fabric, while the binding strip is a non-elastic fabric. The invention further contemplates the placing of the binding strip on the body fabric, so that the lower face $b$ underlies the body fabric to a greater extent than the upper face $b'$ of said binding strip. It is also desired to secure the binding strip to the fabric by two adjacent lines of stitching $s$, $s$, which pass through the narrow face of the binding strip and the body fabric and by a single line of stitching $s'$, which passes through the under portion of the binding, near its free edge.

In order to attach a binding strip of this character to an elastic fabric, it is essential to provide a binder which is capable of folding a strip with one face of the binding strip much wider than the other, and to present the binding strip thus folded to the stitching mechanism. It is further essential to provide a feeding mechanism which includes a feed foot or blade for feeding the elastic goods, so as to gather the same, and thereby avoid undue stretching of the elastic goods, and the improper uniting of the elastic goods to the non-elastic binding strip.

Then again where two lines of stitching pass through one edge of the binding strip, and a single line through the other edge thereof, and these lines are widely spaced, there is considerably more tension or retarding effect of the stitching mechanism on the normal feeding of the binding strip and body fabric. Therefore, it is further essential to provide an auxiliary upper feed which coöperates with the lower feed in feeding the binding strip at the point where the double line of stitching occurs.

The machine, therefore, includes in its construction a binder 16, which is formed with a horizontal guiding channel, and a vertical guiding channel at its receiving end, so that the binding strip may be folded intermediate its ends, and these channels are so proportioned that the vertical portion of the binding strip is much narrower than the horizontal portion. As the binding strip passes through the binder, each of the edges of the strip is folded back upon the outer face of the binding strip. This binder 16 is located in the machine so that the longitudinal axis of the binder is at right angles to the line of feed. The forward end of the binder is also cut at an angle, as shown at 17, so that the strip passing through the binder may be inverted and led to the stitching mechanism.

The vertical portion of the binder adjacent its delivery end is bent as at 18, so as to lie in a horizontal plane which is spaced above the plane of the lower horizontal portion of the binder. The body fabric is fed between the upper horizontal portion of the binder and the lower horizontal portion thereof, and is directed to the stitching mechanism by an edge guide 19. A separating plate 20 is pivoted at 21 to the block forming the edge guide 19, and this plate 20 extends underneath the upper folded edge of the binding strip, and between the same and the elastic fabric. The separating plate thereby provides a free unobstructed passage underneath the same, which allows the elastic body fabric to pass through the binder without being put under any tension or retarding action, which in connection with an elastic fabric causes undue stretching of said fabric.

The upper folded edge of the binding strip, after being inverted, is carried underneath a guiding plate $21^a$, and an edge guide 22 engages the binding strip at the fold and directs the same beneath the presser foot to the stitching mechanism. The binder may also be provided with a tension plate 23, which bears against the strip as it passes into the binder at the receiving end thereof.

From the above description, it will be apparent that I have provided a binding guide through which a binding strip may be led, and the raw edges of the strip folded and the strip so bent and directed to the stitching mechanism that one face of the binding strip will lap the body fabric to a greater extent than the other. The binding guide is so positioned relative to the stitching mechanism, that the needle 9 passing through the presser foot will enter the free edge of the lower face of the binding strip, while the needles 10, 10, will pass through the upper face of the binding strip, the edge of the body fabric and the lower face of the binding strip adjacent the fold in the binding strip.

The binding strip and elastic fabric are carried through the machine by a main feed dog 24. This main feed dog is of the usual construction, and is moved back and forth and raised and lowered through suitable connections with the main shaft. It is thought unnecessary to describe in detail the mechanism for giving the lower feed dog its well known four motions.

In order that the elastic fabric may be slightly gathered as it is fed to the stitching mechanism, and thereby undue stretching of the elastic fabric avoided, as above noted, I have provided a feed foot or blade 25, which is located in front of the presser foot, and so positioned relative to the binder as to engage only the elastic fabric. This feed foot or blade 25 is carried by an arm 26.

In the normal operation of the machine, this feed foot or blade 25 feeds the elastic goods faster than the binding strip is carried through the machine by the main feed, and I, therefore, term this feed foot 25 a differential feed foot.

In order to give the differential feed foot its proper movements, I have provided a supporting bracket 27, which is attached to the overhanging arm by suitable screws, and in said bracket is a reciprocating rod 28. Said bracket is formed with ears 29, in which the rod 28 reciprocates. Mounted on the rod 28 is a supporting block 30, which is formed with a perforated lug 31, and said lug 31 is connected by a link 32 with a depending arm 33, carried by a shaft 34. The shaft 34 is mounted in suitable bearings at the rear end of the overhanging arm, and said shaft is oscillated through a link 35, which is connected at its lower end to a forked arm 36, coöperating with an eccentric 37 on the main shaft 7 of the machine. As this shaft oscillates, the rod 28 will be reciprocated back and forth in the supporting ears 29 in the bracket 27.

The supporting block 30 at its forward end is formed with spaced-plates, in which are freely mounted a sleeve 39. The arm 26 supporting the feed foot 25, carries a stud 40, which extends through the sleeve 39. A spring 41 surrounds the stud 40 and one end of the said spring engages a slot 42 in said stud. The other end of said spring engages a notch in the end of the sleeve 39. A cap screw 43 holds the spring in place, and the end of the spring in the notch in the sleeve.

An arm 44 is located between the plates at the forward end of the supporting block 30, and is rigidly connected to the sleeve 39. This arm 44 is also pivoted at its outer end to a link 45. The link 45 is in turn pivoted to an arm 46, carried by a sleeve 47, freely mounted on the supporting shaft of the overhanging arm at the rear of the machine. The sleeve 47 is oscillated by a link 48, which is connected to a pivoted forked arm coöperating with a cam 49 on the main shaft. As this sleeve oscillates, the link 45 will be raised and lowered, and through its connection with the arm 44 will swing said arm, and through the rigid connection between the arm 44 and the sleeve 39 will oscillate the sleeve. The spring 41 is so positioned as to normally yieldingly press the feed foot 25 against the fabric.

The arm 44 carries a projecting stud 50, which extends underneath the arm 26 supporting the feed foot 25, and this stud, as will be more clearly hereinafter described, raises the differential feed foot from the material, and holds the same raised during the return stroke of the feed foot.

In order that the binding strip may be fed through the machine evenly, I have provided an upper feed dog 51. The presser foot 12 is cut away at 52, to allow the feed dog to engage the binding strip passing underneath the presser foot, and underneath the slot 52 in the presser foot. This slot 52 is positioned directly in rear of the two needles passing through the binding strip adjacent the folded portion of the binding strip. The feed dog 51 is rigidly connected to an arm 53, and said feed dog and arm 53 are mounted to turn freely on a stud 54. The stud 54 extends through a slot 55 in the supporting block 30, and is adjustably held thereon by a suitable nut 56. The upper feed dog 51 and arm 53, are held on the stud by a cap screw 57. Through this connection of the feed dog to the supporting block 60, said feed dog is moved back and forth as the bar 28 is reciprocated. A spring 58 engages the arm 53 at one end, and at its other end rests in a notch 59 in a collar 60, rigidly secured to the stud 54. This spring normally presses the feed dog 51 toward the work support. The arm 53 projects over the lug 50 carried by the arm 44 and rests thereon. Said arm 53 also extends underneath the lug 61, carried by the arm 26, which supports the differential feed foot 25.

When the arm 44 is oscillated through the movements of the link 45, the stud 50 which is in engagement with the arm 53, will raise the feed dog 51 from the material. This upward movement of the arm 53 will cause said arm to strike the stud 61, and raise the differential feed dog from the material.

From the above description, it will be apparent that as the bar 28 reciprocates through the oscillating movements of the arm 33, both the upper feed dog and the differential feed foot which engages the elastic fabric, will be simultaneously moved back and forth. Also through the movements of the link 45, the upper feed dog and the differential feed foot will be raised and lowered from the material. These members 33 and 45 are so timed as to give to the upper feed dog and the differential feed foot, the usual four motions; that is, a forward movement while in contact with the material, then an upward movement to release the material, then a backward movement to starting position, and then a downward movement into engagement with the material.

Inasmuch as the differential feed foot is yieldingly pressed toward the material, and the upper feed dog is yieldingly pressed toward the material, I am able to raise both the differential feed foot and the upper feed dog simultaneously from the material, when the machine is at rest, provided, of course, that the machine is stopped when these members are in engagement with the material. In order to facilitate the lifting of these members for the insertion of the material in the machine, I have provided the upper feed dog with a cross bar 62. This cross bar 62 overlies the edges of the slot in the presser foot, so that when the presser foot is raised through its usual lifting mechanism, said foot will engage the cross bar and raise the upper feed dog. As the upper feed dog is raised, the arm 53 will strike the lug 61, and raise the differential feed foot.

I have, therefore, provided means for simultaneously lifting the presser foot, raising the bar with the feed dog and also the differential feed foot, so that the material may be quickly and easily inserted beneath the presser foot.

It will be further noted that the upper feed dog moves simultaneously with the differential feed foot. This upper feed dog is so positioned relative to its raising and lowering mechanism that the plane of movement of the lower face of the feed dog is above the plane of the lower face of the presser foot when the presser foot is holding the material against the throat plate. The mechanism for operating the upper feed dog and the differential feed foot is so timed that these parts are moved in advance of the main feed dog. That is to say, the differential feed foot engages the material and moves so as to feed the material to a certain extent before the main feed dog is raised into engagement with the material.

Inasmuch as the plane of movement of the lower face of the upper feed dog is above the lower face of the presser foot, the first part of the movement of the upper feed dog is ineffective as it is not in engagement with the binding strip. As soon, however, as the main feed dog is raised into engagement with the fabric, the presser foot will be slightly raised with the main feed dog as is the usual method in a four-motion feed, and this raising of the presser foot with the material, brings the binding strip into engagement with the upper feed dog, and clamps the same between the upper feed dog and the main feed dog, so that during the feeding movements of the main feed dog, the upper feed dog coöperates therewith in feeding the material.

By this timing of the parts and arrangement of the upper feed dog, I am able to move the upper feed dog simultaneously with the differential feed foot, and at the same time render the first movements of the upper feed dog ineffective while the feed foot is effective, and I thereby secure in effect, a differential feeding movement of the feed foot 25, relative to the upper feed dog, notwithstanding that these parts move simultaneously and in unison. While the upper feed dog and the feed foot are moved in unison, the feed foot engages the material in advance of the upper feed dog, which is limited in its downward movement by the pin 50 and does not come into engagement with the material until the main dog raises the material up against the lower face of said upper feed dog, as will be more fully explained hereinafter.

In Fig. 12 of the drawings, I have shown the relative position of the main feed dog, the upper feed dog and the differential feed foot when said differential feed foot is at the forward part of its stroke, and in engagement with the material. While the differential feed foot is moving to the position shown in dotted lines, the upper feed dog is also moving to the position shown in dotted lines, but inasmuch as the lower face of the upper feed dog is out of engagement with the material, this movement of the upper feed dog is ineffective. During this movement of the upper feed dog, the main feed dog is at rest, so far as its backward and forward movements are concerned, but is moving vertically to the position shown in dotted lines, ready for its feeding movement.

This upward movement of the main feed dog brings the material against the upper feed dog, and as the material is then clamped between the main feed dog and the upper feed dog, said upper feed dog will become effective to feed the material during the entire stroke of the main feed dog.

However, before said upper feed dog becomes effective to feed the material, the differential feed foot 25 is moved the distance indicated in the dotted lines, and thereby gathers or feeds in the elastic fabric to a certain extent before the main feed of the machine takes place. During the feeding movement of the main feed, the differential feed foot will also move and carry the elastic material farther underneath the presser foot.

From the above description, it will be apparent that I have not only provided means for folding a binding strip and presenting the same to the stitching mechanism so that one face of the binding strip laps the body fabric to a greater extent than the other, but I have also provided a feeding mechanism which will feed the elastic fabric slightly faster than the non-elastic binding strip, and thereby prevent all undue stretching of the elastic fabric. I have further provided a feeding mechanism which will clamp the binding strip at the point where the two lines of stitching are penetrating the same, and feed the same evenly, although said binding strip is at this point, subjected to the retarding effect of the two lines of stitching, and the usual tensions on the needle threads.

It will be obvious that minor changes in the details of construction and the arrangement of parts may be made, without departing from the spirit of the invention, as set forth in the appended claims.

While I have referred to the function performed by the feed foot 25 as gathering or feeding, it will be understood that its action is not strictly to make gathers, but rather in its first engagement with the fabric, to crowd the knit goods toward the needle, and then to partake of the feeding movements of the other dogs. It will be understood, however, that the parts may be so timed as that the feed foot 25 may actually gather the goods.

Having thus described my invention, what I claim as new and desire to secure by Letters Patent, is:—

1. In a sewing machine, the combination of a presser foot, a main feeding device, an upper feed dog coöperating with said main feeding device, a feed foot in front of said presser foot, means for giving said feed foot a differential movement relative to the main feeding device, and means for simultaneously lifting the upper feed dog and said feed foot.

2. In a sewing machine, the combination of a presser foot, a main feeding device, an upper feed dog coöperating with said main feeding device, a feed foot in front of said presser foot, means for giving said feed foot a differential movement relative to the main feeding device, and means for simultaneously lifting the presser foot, the upper feed dog and said feed foot.

3. In a sewing machine, the combination of a presser foot, a main feeding device, an upper feed dog coöperating with said main feeding device, a feed foot in front of said presser foot, means for giving said feed foot a differential movement relative to the main feeding device, means for raising said presser foot, means carried by said upper feed dog, whereby said presser foot engages said feed dog and raises the same, and means operated by the lifting of the feed dog for raising said feed foot.

4. In a sewing machine, the combination of a feed dog, a feed foot, means for reciprocating said feed dog and feed foot in unison, and means for rendering a portion of the feeding movement of said feed dog ineffective.

5. In a sewing machine, the combination of a main feeding device, an upper feed dog, a feed foot, means for giving said feed foot a differential movement relative to the main feeding device, and means for moving the upper feed dog in unison with the feed foot.

6. In a sewing machine, the combination of a presser foot, an upper feed dog, means for giving said feed dog a feeding movement in a plane above the lower face of the presser foot, and a main feeding device including a feed dog having a differential movement relative to said upper feed dog.

7. In a sewing machine, the combination of a presser foot, an upper feed dog, means for giving said feed dog a feeding movement in a plane above the lower face of the presser foot, a main feeding device including a feed dog having a differential movement relative to said upper feed dog, and a feed foot located in advance of the presser foot and moving in unison with the upper feed dog.

8. In a sewing machine, the combination of a presser foot, a main feeding device, an upper feed dog, a feed foot engaging the material in advance of the presser foot, means for simultaneously moving said feed dog and said feed foot back and forth, means for simultaneously raising and lowering said feed dog and said feed foot, and means for causing said feed foot to engage the material before the upper feed dog.

9. In a sewing machine, the combination of a presser foot, a main feeding device, an upper feed dog, a feed foot engaging the material in advance of the presser foot, means for moving the feed foot and the feed dog back and forth in unison, common means for raising and lowering said feed dog and said feed foot and means for causing said feed dog to engage the fabric before the upper feed dog.

10. In a sewing machine, the combination of an upper feed dog, a spring for normally depressing said feed dog, means for raising said feed dog and for limiting the downward movement thereof, whereby said feed dog may be moved in a plane above the upper face of the material, a lower feed dog, means for raising said lower feed dog into engagement with the material and the material into engagement with the upper feed dog, a feed foot, and means for moving the feed foot up and down and back and forth in unison with said upper feed dog.

11. A sewing machine including in combination, a presser foot, an upper feed dog, a feed foot located in advance of the feed dog, means for giving the feed dog and feed foot a forward and backward movement and a rising and falling movement in unison, means for limiting the downward movement of the upper feed dog, whereby the same moves back and forth in a plane above the lower surface of the presser foot, and means for raising the material into engagement with the upper feed dog subsequent to the engagement of the material by said feed foot.

12. A sewing machine including in combination, a presser foot, an upper feed dog, a feed foot located in advance of the feed dog, means for giving the feed dog and feed foot a forward and backward movement and a rising and falling movement in unison, means for limiting the downward movement of the upper feed dog, whereby the same moves back and forth in a plane above the lower surface of the presser foot, means for raising the material into engagement with the upper feed dog subsequent to the engagement of the material by said feed foot, and means for simultaneously adjusting the forward and backward movement of the feed dog and feed foot.

13. In a sewing machine, the combination of an upper feed dog, a reciprocating block to which said upper feed dog is pivotally attached, means for yieldingly depressing said upper feed dog, an arm pivoted to said block, means for swinging said arm vertically, and a lug carried by said arm and adapted to engage said feed dog for raising the same.

14. In a sewing machine, the combination of an upper feed dog, a reciprocating block to which said upper feed dog is pivotally attached, means for yieldingly depressing said upper feed dog, an arm pivoted to said block, means for swinging said arm vertically, a lug carried by said arm and adapted to engage said feed dog for raising the same, a feed foot pivoted to said block, a spring for yieldingly depressing said feed foot, and a lug carried by said feed foot adapted to be engaged by the feed dog, whereby said feed foot is raised with the feed dog.

15. In a sewing machine including a plurality of needles, a main feed dog extending laterally beyond a vertical plane containing the needles, a feeding foot mounted to act in advance of a portion of the main feed dog, a top feed, coöperating with the main feed dog in rear of the needles and to one side of a vertical plane containing the feeding foot.

16. In a sewing machine, a feeding mechanism including in combination, a plurality of feeding members, means for operating said members, and means for rendering one of said feeding members ineffective while moving rearwardly and during a portion of the time that the other feed member is active and for then rendering both of the feeding members effective to feed the fabric.

In testimony whereof, I affix my signature in the presence of two witnesses.

JAMES R. MOFFATT.

Witnesses:
C. McNeil,
M. A. Allen.

Copies of this patent may be obtained for five cents each, by addressing the "Commissioner of Patents, Washington, D. C."